(No Model.)
H. LANIUS.
BALL BEARING.
No. 558,732. Patented Apr. 21, 1896.
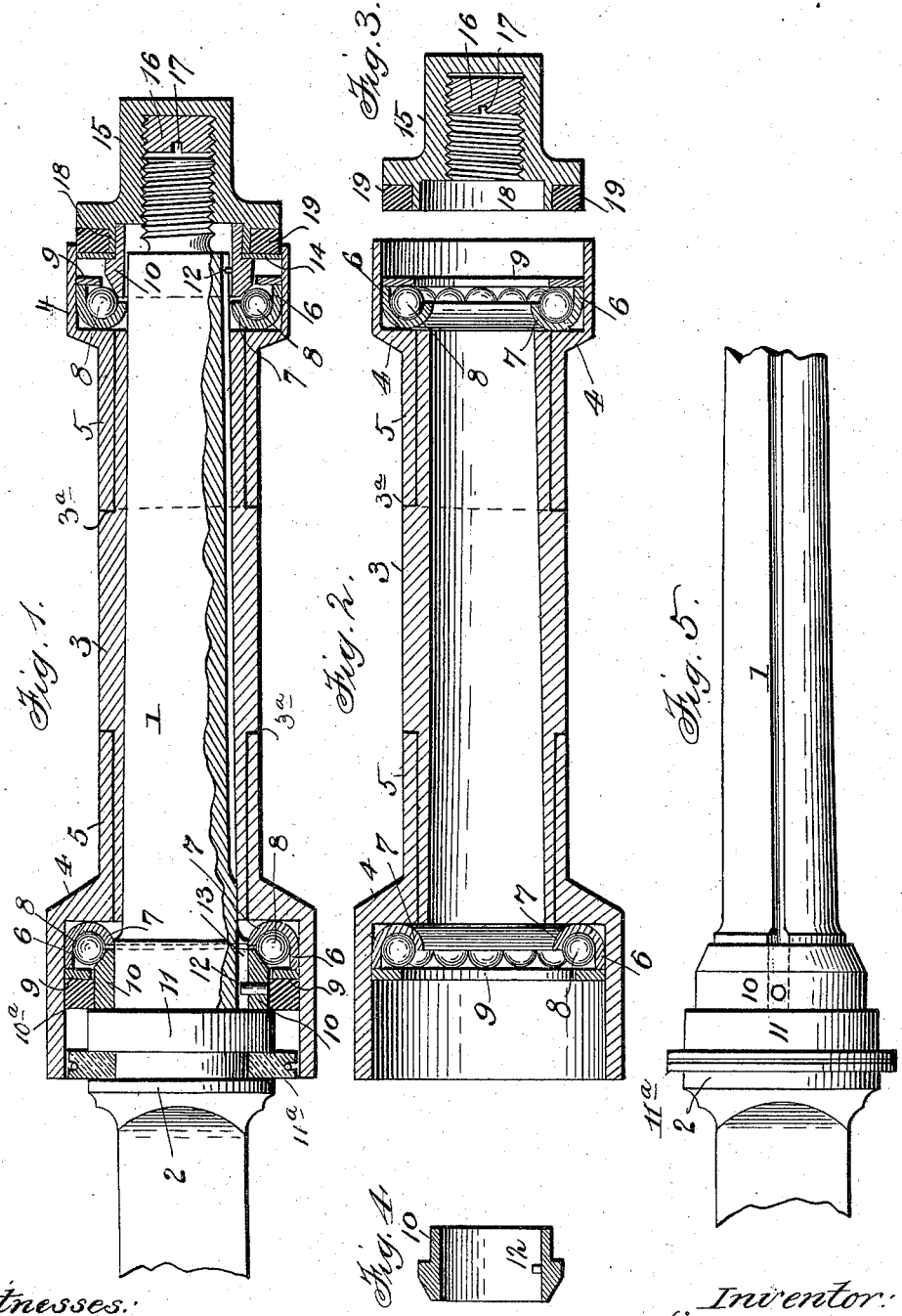
Witnesses:
Franck L. Ourand.
Bennett S. Jones
Inventor:
Henry Lanius,
by Louis Bagger & Co.
Attorneys.

UNITED STATES PATENT OFFICE.

HENRY LANIUS, OF GALION, OHIO.

BALL-BEARING.

SPECIFICATION forming part of Letters Patent No. 558,732, dated April 21, 1896.

Application filed December 23, 1895. Serial No. 573,003. (No model.)

*To all whom it may concern:*

Be it known that I, HENRY LANIUS, a citizen of the United States, and a resident of Galion, in the county of Crawford and State of Ohio, have invented certain new and useful Improvements in Ball-Bearings; and I do hereby declare that the following is a full, clear, and exact description of the invention, which will enable others skilled in the art to which it appertains to make and use the same, reference being had to the accompanying drawings, which form a part of this specification.

My invention relates to ball-bearings for the spindles of buggies, carriages, and other vehicles, which shall possess superior advantages with respect to efficiency in use and which can also be readily applied to the ordinary spindles now in use without requiring any alteration of the spindle.

The invention consists in the novel construction and combination of parts hereinafter fully described and claimed.

In the accompanying drawings, Figure 1 is a central longitudinal section showing an axle-spindle with my improvements applied thereto. Fig. 2 is a similar view of the axle-box. Fig. 3 is a similar view of the bur or nut with the regulating-screw. Fig. 4 is a similar view of one of the cones. Fig. 5 is an elevation of the spindle, showing the inner cone and washer in place thereon.

In the said drawings the reference-numeral 1 designates an ordinary axle-spindle formed at the inner end with a shoulder 2 and screw-threaded at the outer end to receive the bur or nut, hereinafter described.

The numeral 3 designates the axle-box, having each end reduced and formed with shoulders 3ª to receive the cylindrical cups 4, which fit snugly on said reduced ends. Each of these cups is formed with a socket 5, which fits on the reduced end of the axle-box. Fitting in these cups is a race or way to receive the balls which form the bearings. The race consists of an annulus or ring 6, the edge of which is bent inwardly, forming a flange 7. The said annulus will thus have an approximately semicircular shape in cross-section, forming a curved way in which are seated balls 8. These balls are held in place by a metal flat ring or annulus 9, fitting snugly in the cups.

The numeral 10 designates two cones fitting on the spindle, and the inner one of which bears against a metal washer 11, which in turn bears against a leather or other washer 11ª, confined between the metal washer and the shoulder 2 of the spindle. A washer 10ª is interposed between the ring 9 and the washer 11. The other cone fits on the outer end of the spindle, and the beveled faces of both cones contact with the balls 8 and form a track therefor. On the inner side each of the cones is provided with a stud or key 12, which engages a groove 13 in the spindle and prevents the cones from turning. The outer cone is reduced at the outer end, and fitting on said reduced portion is a flat ring or washer 14. Fitting on the screw-threaded end of the spindle is a bur or nut 15, in which is located a screw-threaded adjusting or registering plug 16, formed on its inner end with a slot or nick 17 to receive a screw-driver by which it can be turned in or out. The inner end of the nut or bur is formed with a flange 18, rabbeted on its outer side to receive a leather or other washer 19, which bears against the ring or washer 14.

In practice the inner cone and washers are placed on the spindle, and the latter passed through the cups and box and the bur or nut screwed on the spindle to hold the parts in place. It will be seen that the box and accessories can be applied to the ordinary spindles now in use, when not too much worn, by simply adding the cones to the same. By means of the regulating-screw the parts can be readily adjusted or regulated.

It will be seen that I do away with all screw-threads except those of the bur or nut, the regulating-plug, and the spindle end, and the cups containing the balls slip on the ends of the axle-box, so that they can be readily adjusted.

Having thus fully described my invention, what I claim is—

The combination with the spindle formed with a screw-threaded outer end and a longitudinal groove 13, and provided with a shoulder 2, of the axle-box 3, having each end reduced and formed with shoulders 3ª, between the ends, the cups 4 having sockets 5, the races 6, having their inner edges turned inwardly and then outwardly forming semicircular flanges 7, the balls seated therein, the flat rings 9, fitting in the cups and bearing against the balls, the cones against which the balls abut, each having a key 12 engaging the aforesaid longitudinal groove, the ring 14 located in the outer cup and bearing against an annular shoulder on the outer cone, the washer 19, the screw-threaded nut or bur 15, having an inwardly-extending annular flange 18, engaging with the outer cone, the regulating screw-plug located in said nut, and the washers $10^a$ 11 and $11^a$, at the inner end of spindle, substantially as described.

In testimony that I claim the foregoing as my own I have hereunto affixed my signature in presence of two witnesses.

HENRY LANIUS.

Witnesses:
W. J. GEER,
W. F. BLAND.